(12) United States Patent
Ishida et al.

(10) Patent No.: US 8,477,476 B2
(45) Date of Patent: Jul. 2, 2013

(54) CERAMIC ELECTRONIC COMPONENT

(75) Inventors: Atsushi Ishida, Nagaokakyo (JP);
Takumi Taniguchi, Nagaokakyo (JP);
Takehisa Sasabayashi, Nagaokakyo (JP); Tomoyuki Kuwano, Nagaokakyo (JP); Akihiro Motoki, Nagaokakyo (JP); Toshiyuki Iwanaga, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/079,049

(22) Filed: Apr. 4, 2011

(65) Prior Publication Data

US 2011/0255209 A1  Oct. 20, 2011

(30) Foreign Application Priority Data

Apr. 15, 2010  (JP) ................. 2010-093918

(51) Int. Cl.
*H01G 4/06* (2006.01)
*H01G 4/228* (2006.01)

(52) U.S. Cl.
USPC .............. 361/306.1; 361/321.2; 361/321.3; 361/306.3

(58) Field of Classification Search
USPC ............ 361/306.1, 321.2, 321.3, 306.3
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1* | 3/2005 | Ritter et al. | 336/200 |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2009/0052114 A1* | 2/2009 | Motoki et al. | 361/306.3 |

FOREIGN PATENT DOCUMENTS

| | | |
|---|---|---|
| JP | 08-037127 A | 2/1996 |
| JP | 2009-295602 A | 12/2009 |

OTHER PUBLICATIONS

Motoki et al., "Multilayer Electronic Component and Method for Manufacturing the Same", U.S. Appl. No. 12/263,556, filed Nov. 3, 2008.
Ogawa et al., "Laminated Electronic Component and Manufacturing Method Therefor", U.S. Appl. No. 12/788,340, filed May 27, 2010.

* cited by examiner

*Primary Examiner* — David M Sinclair
*Assistant Examiner* — Arun Ramaswamy
(74) *Attorney, Agent, or Firm* — Keating & Bennett, LLP

(57) ABSTRACT

A ceramic electronic component includes a ceramic element including opposed side surfaces, an inner electrode, and an external terminal electrode. The external terminal electrode includes a first conductive layer and a second conductive layer. The first conductive layer is formed by plating so as to be electrically coupled to an exposed section of the internal electrode exposed to the side surfaces. The second conductive layer is arranged so as to cover the first conductive layer and includes conductive resin. The value of T2/T1 is in the range of about 3.4 to about 11.3, where T1 indicates the thickness of the first conductive layer and T2 indicates the thickness of the second conductive layer.

3 Claims, 3 Drawing Sheets

CERAMIC ELECTRONIC COMPONENT

BACKGROUND OF THE INVENTION

1. Field of the Invention

The present invention relates to a ceramic electronic component that includes an external terminal electrode coupled to an internal conductor and, more specifically, to a ceramic electronic component that includes an external terminal electrode including a conductive layer formed by plating directly on a surface of a ceramic element.

2. Description of the Related Art

A monolithic ceramic capacitor, which is one of the representative ceramic electronic components, includes a dielectric ceramic element, a plurality of internal electrodes arranged therein, and an external terminal electrode connecting the plurality of internal electrodes.

Such a ceramic electronic component is required to be capable of relaxing a stress caused by warping of a substrate on which the ceramic electronic component is implemented, be less susceptible to degradation in electrical characteristics and to occurrences of cracks as compared to traditional ceramic electronic components, and to have an increased effective volume ratio.

One example that satisfies these requirements is a laminated ceramic electronic component described in Japanese Unexamined Patent Application Publication No. 2009-295602. This electronic component includes a terminal electrode including a first electrode layer formed by plating and a second electrode layer made of conductive resin and provided on the first electrode layer.

With the ceramic electronic component described in Japanese Unexamined Patent Application Publication No. 2009-295602, because it includes the second electrode layer made of conductive resin provided on the first electrode layer formed by plating, a stress caused by warping of the substrate can be relaxed and defects, such as degradation in electrical characteristics and occurrences of cracks, are reduced. Additionally, because the first electrode layer is formed by plating, the external terminal electrode can be thin and the effective volume ratio of the laminated electronic component can be improved.

However, with a structure in which an external terminal electrode includes two layers, like the above-described traditional ceramic electronic component, sufficient characteristics, for example, a capacitance characteristic, moisture resistance, a mechanical strength characteristic (impact resistance, may be unobtainable. Therefore, ceramic electronic components having further satisfactory characteristics are being demanded.

SUMMARY OF THE INVENTION

To overcome the problems described above, preferred embodiments of the present invention provide a ceramic electronic component that prevents a reduction in the effective volume ratio caused by an increase in the thickness of an external terminal electrode and that has satisfactory characteristics, such as a capacitance characteristic, weather resistance, and a mechanical strength characteristic, for example.

According to a preferred embodiment of the present invention, a ceramic electronic component preferably includes a ceramic element, an inner electrode, and at least one external terminal electrode. The ceramic element includes opposed side surfaces. The inner electrode is preferably arranged in the ceramic element and includes an exposed section that is exposed to the side surfaces. The at least one external terminal electrode is arranged on the side surfaces of the ceramic element so as to be electrically coupled to the exposed section of the internal electrode. The at least one external terminal electrode preferably includes a first conductive layer and a second conductive layer. The first conductive layer is preferably formed by plating directly on the side surfaces so as to be electrically coupled to the exposed section of the inner electrode. The second conductive layer is preferably arranged on the side surfaces so as to cover the first conductive layer and includes a conductive resin. The following expression is preferably satisfied:

T2/T1=about 3.4 to about 11.3 where T1 is a thickness of the first conductive layer and T2 is a thickness of the second conductive layer.

With this configuration, the thickness of the external terminal electrode is prevented from being significantly increased, and the external terminal electrode is more firmly fixed to the ceramic element and effectively absorbs a stress applied thereto.

Because the ceramic electronic component according to a preferred embodiment of the present invention includes the external terminal electrode that is firmly fixed to the ceramic element firmly and that has a great ability to absorb stress, if the ceramic electronic component is a monolithic ceramic capacitor, for example, products having a satisfactory capacitance characteristic and weather resistance and satisfactory impact resistance, for example, to a drop, is reliably provided.

In the ceramic electronic component according to a preferred embodiment of the present invention, the thickness T1 of the first conductive layer may preferably be in a range of about 3.6 µm to about 10.2 µm, for example.

In this case, the ceramic electronic component having outstanding reliability of electrical connection with the internal electrode and satisfactory electrical characteristics is reliably obtained.

In the ceramic electronic component according to a preferred embodiment of the present invention, the thickness T2 of the second conductive layer may preferably be in a range of about 34.3 µm to about 40.8 µm, for example.

In this case, the ceramic electronic component that prevents an increase in the thickness of the external terminal electrode and that can be more firmly fixed to the ceramic element and effectively absorb a stress is reliably obtained.

In the ceramic electronic component according to a preferred embodiment of the present invention, the at least one external terminal electrode may preferably include two or more external terminal electrodes arranged on each of the opposed side surfaces, a longitudinal-direction dimension of the side surface may preferably be about 1.2 mm or less, for example, and a dimension between the opposed side surfaces may preferably be about 1.0 mm or less, for example.

For a small ceramic electronic component, in order to provide a plurality of external terminal electrodes on a single side surface, it is necessary that the external terminal electrodes be arranged at specific positions so as to prevent them from causing a short circuit.

However, if a method of applying and firing conductive paste to form an underlying electrode is used, in order to apply the conductive paste to a specific position to form the underlying electrode, it is necessary that the conductive paste be applied with high precision. This complicates the production process and decreases the productivity.

In contrast, with various preferred embodiments of the present invention, the first conductive layer, which defines an underlying electrode, can be efficiently formed on the exposed section of the internal electrode and its adjacent area.

Therefore, the ceramic electronic component having high reliability is efficiently obtained.

To form the second conductive layer in a preferred embodiment of the present invention, a step of applying conductive resin (paste) is performed, and this application requires high precision. However, unlike the above-described case where a method of applying and firing conductive paste is also used to form the underlying electrode, i.e., the first conductive layer, the production process can be simplified and defects such as, for example, short circuits can be significantly reduced and productivity can be significantly improved.

Accordingly, various preferred embodiments of the present invention are especially useful when applied to a ceramic electronic component used in a small electronic device, such as a cellular phone or a portable audio device, for example, and particularly requiring satisfactory impact resistance, for example, to a drop, e.g., a capacitor array that includes a plurality of capacitor sections arranged on a single ceramic element.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Features of preferred embodiments of the present invention are described in further detail below with reference to the drawings.

A monolithic ceramic capacitor is described as one example of a ceramic electronic component according to a preferred embodiment of the present invention.

Figure 1:
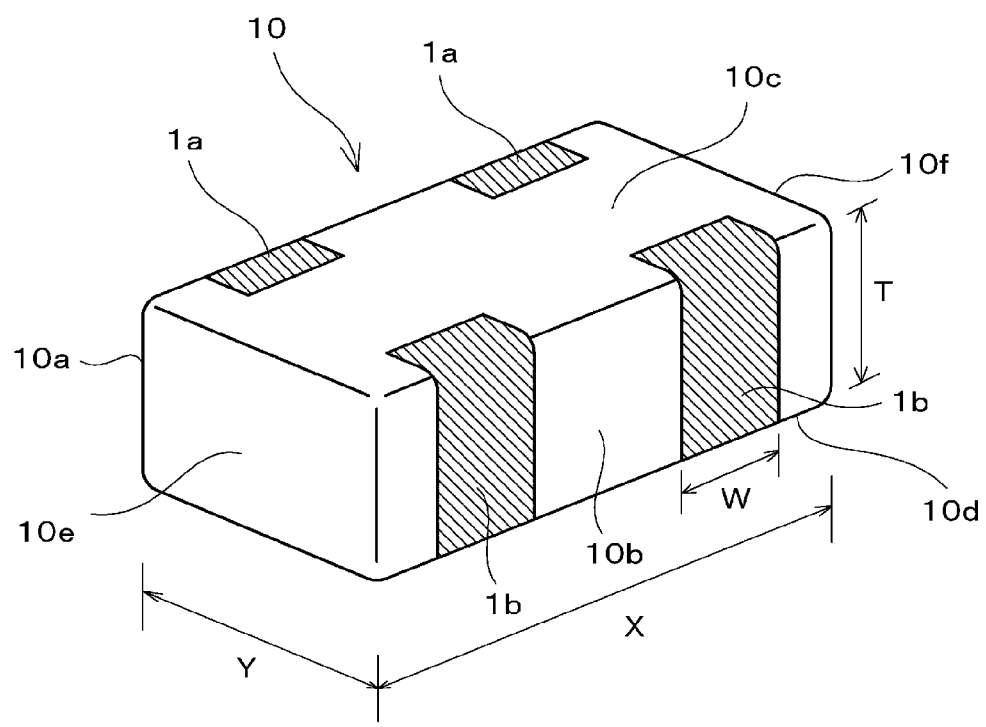
FIG. 1 is a perspective view of a ceramic electronic component according to a preferred embodiment of the present invention.
Figure 2A:
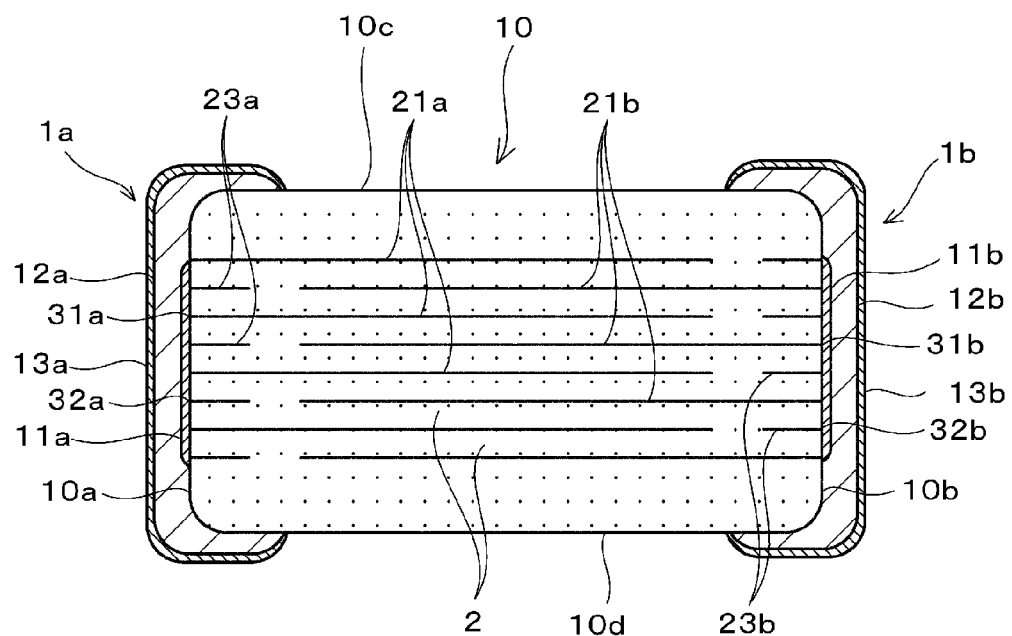
FIG. 2A is a front cross-sectional view of the monolithic ceramic capacitor illustrated in FIG. 1.
Figure 2B:
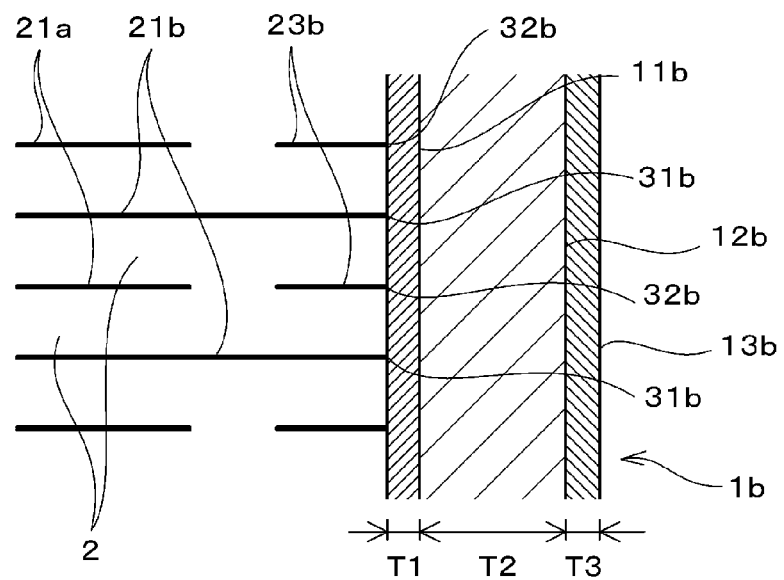
FIG. 2B is a front cross-sectional view that illustrates an enlarged main section thereof.
Figure 3:
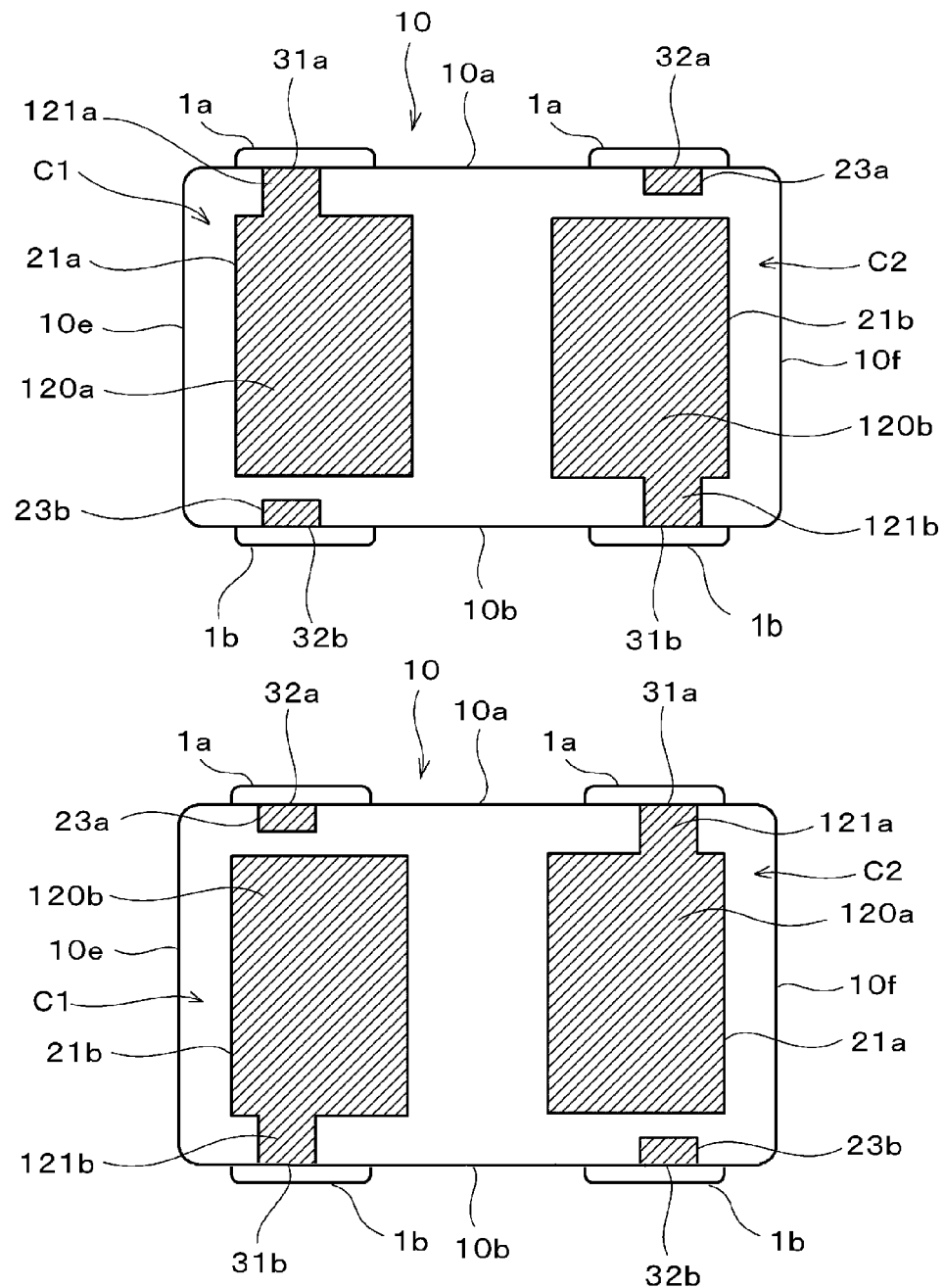
FIG. 3 illustrates plan views of an arrangement of inner electrodes adjacent to each other with a ceramic layer disposed therebetween in a lamination direction in a ceramic element of the ceramic electronic component according to a preferred embodiment of the present invention.

As illustrated in FIGS. 1 to 3, the monolithic ceramic capacitor preferably includes a ceramic element 10, internal electrodes 21a and 21b arranged in the ceramic element 10, and a pair of external terminal electrodes 1a and 1b electrical connected to the internal electrodes 21a and 21b. The internal electrodes 21a and 21b are laminated with a ceramic layer 2 disposed therebetween and alternately extend to opposed side surfaces 10a and 10b, respectively, of the ceramic element 10.

The internal electrode 21a preferably includes an effective electrode section 120a and an extended section 121a, and the internal electrode 21b preferably includes an effective electrode section 120b and an extended section 121b. The effective electrode sections 120a and 120b are preferably opposed to each other with the ceramic layer 2 disposed therebetween. The extended sections 121a and 121b preferably extend from the effective electrode sections 120a and 120b, respectively, to the side surfaces 10a and 10b, respectively. The sections of the extended sections 121a and 121b that are exposed to the opposed side surfaces 10a and 10b of the ceramic element 10 define exposed sections 31a and 31b of the internal electrodes 21a and 21b.

In the monolithic ceramic capacitor according to the present preferred embodiment, to provide two capacitor sections in the single ceramic element 10, the internal electrode 21a including the exposed section 31a that extends to the side surface 10a and the internal electrode 21b including the exposed section 31b that extends to the side face 10b, are preferably arranged in coplanar alignment.

Of the external terminal electrodes 1a and 1b, the external terminal electrode 1a is preferably arranged in electrical communication with the exposed section 31a of the internal electrode 21a that extends to the side surface 10a of the ceramic element 10 and the external terminal electrode 1b is preferably arranged in electrical communication with the exposed section 31b of the internal electrode 21b that extends to the side surface 10b.

That is, the monolithic ceramic capacitor according to the present preferred embodiment is an array-type monolithic ceramic capacitor preferably including a plurality of internal electrodes 21a and 21b arranged in coplanar alignment in the ceramic element 10 that are opposed to specific internal electrodes of a plurality of internal electrodes 21a and 21b in another coplanar alignment in the ceramic element 10, respectively, with the ceramic layer 2 disposed therebetween such that a plurality of (preferably two in the present preferred embodiment) capacitor sections C1 and C2 as shown in FIG. 3 are arranged in the single ceramic element 10.

For the monolithic ceramic capacitor, the longitudinal direction dimension X shown in FIG. 1 of each of the side surfaces 10a and 10b is preferably about 0.9 mm, for example, and the dimension Y shown in FIG. 1 between the opposed side surfaces 10a and 10b is preferably about 0.6 mm, for example.

As illustrated in FIGS. 2A and 2B, in the monolithic ceramic capacitor according to the present preferred embodiment, the external terminal electrode 1a preferably includes a first conductive layer 11a and a second conductive layer 12a, and the external terminal electrode 1b preferably includes a first conductive layer 11b and a second conductive layer 12b. The first conductive layers 11a and 11b are preferably formed directly on the side surfaces 10a and 10b by plating so as to be electrically coupled to the exposed sections 31a and 31b of the internal electrodes 21a and 21b, respectively. The second conductive layers 12a and 12b preferably include conductive resin and are arranged on the side surfaces 10a and 10b, respectively, so as to cover the first conductive layers 11a and 11b, respectively.

In the monolithic ceramic capacitor according to the present preferred embodiment, the external terminal electrodes 1a and 1b preferably further include third conductive layers 13a and 13b, respectively, arranged so as to cover the second conductive layers 12a and 12b, respectively.

Each of the first conductive layers 11a and 11b and the second conductive layers 12a and 12b included in the external terminal electrodes 1a and 1b preferably have a thickness that satisfies the following expression:

$T2/T1 =$ about 3.4 to about 11.3 where T1 indicates the thickness of each of the first conductive layers 11a and 11b and T2 indicates the thickness of each of the second conductive layers 12a and 12b.

As illustrated in FIG. 3, in the monolithic ceramic capacitor according to the present preferred embodiment, dummy internal electrodes 23a and 23b are preferably arranged in gap sections (regions where no electrodes are arranged) adjacent to the side surfaces 10a and 10b, which are opposite to the side surfaces to which the extended sections 121a and 121b extend, respectively, in the same plane as the plane in which the internal electrodes 21a and 21b lie. The dummy internal electrodes 23a and 23b are not electrically connected to the internal electrodes 21a and 21b, respectively, and thus, do not contribute to the electrical characteristics. The dummy internal electrodes 23a and 23b are preferably exposed to the side surfaces 10a and 10b, which are opposite to the side surfaces to which the internal electrodes 21a and 21b in the same plane extend, respectively.

Exposed sections 32a and 32b of the dummy internal electrodes 23a and 23b exposed to the side surfaces 10a and 10b, respectively, facilitate deposition of plating to the side surfaces 10a and 10b of the ceramic element 10 during the formation of the first conductive layers 11a and 11b on these side surfaces by plating.

The configuration of each section is described in further detail below.

[1] Ceramic Element

As illustrated in FIGS. 1 to 3, the ceramic element 10 preferably includes a plurality of laminated ceramic layers 2 and includes the opposed side surfaces 10a and 10b, opposed main surfaces 10c and 10d, and opposed end surfaces 10e and 10f.

The ceramic element 10 may preferably include rounded corner and ridge sections in order to prevent chipping and breaking of the external terminal electrodes 1a and 1b.

Examples of preferred a ceramic material of each of the ceramic layers 2 include dielectric ceramic materials having barium titanate ($BaTiO_3$), calcium titanate ($CaTiO_3$), strontium titanate ($SrTiO_3$), and calcium zirconate ($CaZrO_3$), respectively, as a principle component. To adjust characteristics, a material in which an accessory ingredient, such as a manganese compound, an iron compound, a chromium compound, a cobalt compound, or a nickel compound, for example, is added to any of the principle components, can also preferably be used.

Depending on the type of a ceramic electronic component, a piezoelectric ceramic material (e.g., a PZT ceramic material), a semiconductor ceramic material (e.g., a spinel ceramic material), and a magnetic ceramic material (e.g., ferrite) can also preferably be used.

The ceramic electronic component according to the present preferred embodiment is preferably a monolithic ceramic capacitor and is preferably configured to provide capacitance in effective element sections in which the internal electrodes 21a and 21b are opposed to each other with the ceramic layer (dielectric ceramic layer) 2 disposed therebetween.

The ceramic layer 2 in the monolithic ceramic capacitor according to the present preferred embodiment may preferably have a thickness of about 0.5 μm to about 10 μm, for example.

[2] Internal Electrode

Various types of materials can preferably be used as a material of each of the internal electrodes 21a and 21b (electrode material). Examples of the electrode material include nickel, copper, silver, palladium, an alloy of silver and palladium, and gold.

Each of the internal electrodes 21a and 21b may preferably have a thickness of about 0.3 μm to about 2.0 μm.

The internal electrodes 21a and 21b, which preferably include the effective electrode section 120a, the extended section 121a, and the exposed section 31a and the effective electrode section 120b, the extended section 121b, and the exposed section 31b, respectively, may have any suitable pattern.

The dummy internal electrodes 23a and 23b, which do not contribute to the electrical characteristics and facilitate deposition of plating during the formation of the first conductive layers 11a and 11b on the side surfaces 10a and 10b of the ceramic element 10 by plating are preferably provided, but are not required.

The same material that is used for the internal electrodes 21a and 21b can also be used for the dummy internal electrodes 23a and 23b. However, a different type of material can also be used.

[3] External Terminal Electrode (1) First Conductive Layer

As illustrated in FIGS. 2A and 2B, the first conductive layers 11a and 11b are preferably formed by plating such that they are directly connected to the exposed sections 31a and 31b of the internal electrodes 21a and 21b and to the dummy internal electrode exposed sections 32a and 32b.

Examples of a material of the first conductive layers 11a and 11b include a metal selected from the group consisting of copper, nickel, tin, palladium, gold, silver, bismuth, and zinc and an alloy containing the metal. The first conductive layers 11a and 11b directly connected to the exposed sections 31a and 31b and to the dummy internal electrode exposed sections 32a and 32b can preferably be formed by plating of the above-described metal or alloy.

For example, if nickel is used as the internal electrodes 21a and 21b, copper, which has good connectivity with nickel, for example, may preferably be used as the first conductive layers 11a and 11b.

To ensure the reliability of the electrical connection with the internal electrodes and to obtain a ceramic electronic component having satisfactory electrical characteristics, the thickness T1 of each of the first conductive layers 11a and 11b may preferably be in the range of about 3.6 μm to about 10.2 μm, for example.

Both electrolytic plating and electroless plating can be used as a plating method used to form the first conductive layers 11a and 11b. However, electroless plating may require preprocessing by catalysis or other material, processes or devices to improve the speed of deposition of plating, which disadvantageously complicates the process. Therefore, electrolytic plating is preferably used.

Barrel plating may also preferably be used as a plating technique.

(2) Second Conductive Layer

The second conductive layers 12a and 12b are arranged on the side surfaces 10a and 10b of the ceramic element 10, respectively, so as to cover the first conductive layers 11a and 11b, respectively.

As illustrated in FIG. 2A, the second conductive layers 12a and 12b may preferably be arranged to extend from the side surfaces 10a and 10b of the ceramic element 10, respectively, to the main surfaces 10c and 10d.

The second conductive layers 12a and 12b preferably include a conductive resin, for example. The type of the conductive resin is not particularly limited, and, for example, one in which filler metal, such as silver or copper, is distributed as a conductive component in thermosetting resin, such as epoxy resin or phenol resin, may preferably be used.

The thickness T2 of each of the second conductive layers 12a and 12b may preferably be in the range of about 34.3 μm to about 40.8 μm, for example, in order to provide an external terminal electrode that has a reduced thickness, that can be more firmly fixed to the ceramic element, and that has an outstanding ability to absorb a stress.

In formation of the second conductive layers 12a and 12b, typically, a method of applying conductive resin (paste) so as to cover the first conductive layers 11a and 11b and, for example, heating it to a specific temperature to harden it can preferably be used.

A method of forming the second conductive layers is not particularly limited. For example, a method of applying photocurable conductive resin used as conductive resin so as to cover the first conductive layers 11a and 11b and then hardening it by emitting light thereon can also be used.

(3) Third Conductive Layer

In the present preferred embodiment, the external terminal electrodes 1a and 1b preferably include the third conductive layers 13a and 13b, respectively, arranged so as to cover the second conductive layers 12a and 12b, respectively. However, a ceramic electronic component according to another preferred embodiment of the present invention may not include the third conductive layers 13a and 13b.

The third conductive layers 13a and 13b may preferably be formed by plating, for example.

Each of the third conductive layers 13a and 13b may preferably include a plurality of plating layers.

For example, nickel, which can provide soldering barrier performance, can preferably be used as a metal material of a first plating layer included in the third conductive layers 13a and 13b, and tin or gold, which has good solder wettability, can preferably be used as a metal material of a second plating layer included in the third conductive layers 13a and 13b. For the monolithic ceramic capacitor according to the present preferred embodiment, a nickel plating layer preferably provided as the first plating layer included in the third conductive layers 13a and 13b, and a tin plating layer is preferably provided as the second plating layer included in the third conductive layers 13a and 13b.

Typically, the thickness T3 of each of the third conductive layers 13a and 13b may preferably be in the range of about 3 μm to about 30 μm. If the third conductive layer includes a plurality of plating layers, the thickness of a single plating layer may preferably be in the range of about 1 μm to about 15 μm.

[4] Production of Ceramic Electronic Component

The monolithic ceramic capacitor illustrated in FIGS. 1 to 3 can preferably be produced by a process described below, for example.

For example, a ceramic green sheet formed using a dielectric ceramic material having $BaTiO_3$, $CaTiO_3$, $SrTiO_3$, or $CaZrO_3$, as a principal component and internal electrode conductive paste that includes metallic particles of nickel, copper, silver, palladium, an alloy of silver and palladium, or gold as an electrode material are preferably prepared.

The ceramic green sheet and the conductive paste include a binder and a solvent. Various kinds of publicly known organic binders and organic solvents can be used as the binder and the solvent.

Then, a specific pattern of the conductive paste is preferably printed on the ceramic green sheet by, for example, screen printing to form an internal electrode pattern. In this manner, the ceramic green sheet including the internal electrode pattern formed thereon is obtained.

A specific number of ceramic green sheets on which no internal electrode patterns are formed are prepared as a ceramic green sheet defining an external layer.

Next, a specific number of external-layer ceramic green sheets on which no internal electrode patterns are formed are preferably laminated, and the ceramic green sheets each having the internal electrode pattern formed thereon are preferably laminated in sequence on the laminated external-layer ceramic green sheets. A specific number of external-layer ceramic green sheets are then preferably laminated on the above-described laminated layers, and a mother laminate is produced.

Then, the obtained mother laminate is preferably pressed and bonded in the direction of lamination by, for example, hydrostatic pressure pressing.

The bonded mother laminate is preferably cut into a specific size, and a green ceramic laminate is obtained. Then, the ceramic laminate is preferably processed by, for example, barrel polishing such that its corner and ridge sections are rounded. Depending on the circumstances and the application, the step barrel polishing the rounding corner and ridge sections may preferably be omitted.

Then, the green ceramic laminate is fired. The firing temperature varies also depending on the ceramic material or internal electrode material. However, it may preferably be in the range of about 900° C. to about 1,300° C., for example.

The fired ceramic laminate is preferably subjected to plating to form the first conductive layers 11a and 11b on the exposed sections 31a and 31b of the internal electrodes 21a and 21b and on the dummy internal electrode exposed sections 32a and 32b, as illustrated in FIGS. 2A and 2B.

The deposited plating is grown and, as schematically illustrated in FIGS. 2A and 2B, the first conductive layers 11a and 11b are formed on the side surfaces 10a and 10b of the ceramic element 10.

In this plating step, electrolytic plating is preferably used, and barrel plating is preferably used as a plating technique, for example.

The second conductive layers 12a and 12b are preferably formed on the first conductive layers 11a and 11b. For the present preferred embodiment, after the application of conductive resin so as to cover the first conductive layers 11a and 11b, the conductive resin (paste) is preferably heated at about 200° C. to be cured by heat, and thus, the second conductive layers 12a and 12b are formed.

Then, the third conductive layers 13a and 13b are preferably formed by plating on the second conductive layers 12a and 12b.

For the present preferred embodiment, the third conductive layers 13a and 13b preferably include a plurality of plating layers. That is, a nickel plating layer capable of providing solder barrier performance is preferably formed as the first plating layer by electrolytic plating, and a tin plating layer having good solder wettability is preferably formed as the second plating layer by electrolytic plating.

In this manner, the monolithic ceramic capacitor having the structure illustrated in FIGS. 1 to 3 is obtained. For the present preferred embodiment, to evaluate characteristics, monolithic ceramic capacitors having different values in the range provided in the Table below as the thickness T1 of the first conductive layer and the thickness T2 of the second conductive layer were produced.

As previously described, for the monolithic ceramic capacitors produced according to preferred embodiments of the present preferred embodiment, the longitudinal-direction dimension X as shown in FIG. 1 of each of the side surfaces 10a and 10b is preferably about 0.9 mm, for example, and the dimension Y as shown in FIG. 1 between the opposed side surfaces 10a and 10b is preferably about 0.6 mm, for example.

[5] Evaluation of Characteristics

For the ceramic electronic components produced by the above-described method so as to have different values in the range provided in the Table below as the thickness T1 of the first conductive layer and the thickness T2 of the second conductive layer included in the external terminal electrode, the fundamental characteristic (capacitance characteristic), weather resistance (fraction defective in a humidity load test), and mechanical strength characteristic (fraction defective in a drop test) were examined. These characteristics were measured for 60 samples of each of the ceramic electronic components.

The thickness T1 of the first conductive layer and the thickness T2 of the second conductive layer were measured by a method described below.

single glass epoxy substrate with 60 samples soldered thereon was dropped about 10,000 times from a height of about 1 m. A ceramic electronic component for which all 60 samples were free from cracking or chipping was assessed as good (◯), whereas a ceramic electronic component for which even one of 60 samples had cracking or chipping was assessed as poor (x).

Measurements of the characteristics are presented in the Table.

TABLE

| Sample No. | Thickness of First Conductive Layer T1 (μm) | | | Thickness of Second Conductive Layer T2 (μm) | T2/T1 | Capacitance Characteristic (No. of Defectives/Total Sample No.) | Weather Resistance (No. of Defectives/Total Sample No.) | Impact Resistance (No. of Defectives/Total Sample No.) |
|---|---|---|---|---|---|---|---|---|
| | Max. | Min. | Avg. | | | | | |
| 1* | 0.6 | 0.8 | 0.7 | 43.7 | 62.4 | X (16/60) | — | ◯ (0/60) |
| 2* | 0.6 | 1.2 | 1.0 | 43.4 | 43.4 | X (3/60) | — | ◯ (0/60) |
| 3* | 1.2 | 2.1 | 1.6 | 42.8 | 26.8 | ◯ (0/60) | X (2/60) | ◯ (0/60) |
| 4 | 3.0 | 4.2 | 3.6 | 40.8 | 11.3 | ◯ (0/60) | ◯ (0/60) | ◯ (0/60) |
| 5 | 3.5 | 5.0 | 4.1 | 40.3 | 9.8 | ◯ (0/60) | ◯ (0/60) | ◯ (0/60) |
| 6 | 5.9 | 7.8 | 6.6 | 37.8 | 5.7 | ◯ (0/60) | ◯ (0/60) | ◯ (0/60) |
| 7 | 6.4 | 9.9 | 7.8 | 36.6 | 4.7 | ◯ (0/60) | ◯ (0/60) | ◯ (0/60) |
| 8 | 5.7 | 10.0 | 8.7 | 35.7 | 4.1 | ◯ (0/60) | ◯ (1/60) | ◯ (0/60) |
| 9 | 7.0 | 11.2 | 10.2 | 34.3 | 3.4 | ◯ (0/60) | ◯ (1/60) | ◯ (0/60) |
| 10* | 11.0 | 13.0 | 12.0 | 32.4 | 2.7 | ◯ (0/60) | ◯ (1/60) | X (1/60) |

First, a ceramic element was polished from its side surface to a ½ position in the width direction of the external terminal electrode (W direction in FIG. 1) using a polisher (GP-101 from Union Optical Co., Ltd.), and the thickness of each conductive layer at one side was measured at a ½ position in the height direction of the ceramic element (T direction in FIG. 1) using an optical microscope (MEASURESCOPE MM-40 from Nikon Corporation).

The total thickness of the nickel layer as the first plating layer and the tin layer as the second plating layer, that is, thickness T3 of the third conductive layer was approximately 6 μm.

For the fundamental characteristic (capacitance characteristic), the electrostatic capacity obtained under the condition of about 1 kHz and about 0.5 V was measured using a C meter 4278A from Agilent Technologies. A ceramic electronic component for which all of the 60 samples reached a target value of electrostatic capacity was assessed as good (◯), whereas a ceramic electronic component for which even one of the 60 samples did not reach a target value of electrostatic capacity was assessed as poor (x).

For the weather resistance, a humidity load test was conducted under the condition of about 125° C. and about 95 RH %. A ceramic electronic component for which no more than one of the 60 samples exhibited insulation resistance reduced to about $1 \times 10^8 \Omega$ or less was assessed as good (◯), whereas a ceramic electronic component for which more than one sample exhibited such insulation resistance was assessed as poor (x).

For the mechanical strength characteristic (impact resistance), a drop test was conducted under the condition that a In the Table, a sample of a sample number marked with * is not in the range of preferred embodiments of the present invention.

The Table reveals that samples that exceed the range of preferred embodiments of the present invention, i.e., the samples of Nos. 1 and 2, in which the ratio between the thickness T1 of the first conductive layer and the thickness T2 of the second conductive layer (T2/T1) is about 62.4 (for sample No. 1) and about 43.4 (for sample No. 2), had a poor capacitance characteristic and not all samples reached the target capacitance.

It is considered that for the samples of Nos. 1 and 2, because the first conductive layer was as thin as about 0.7 μm (for sample No. 1) and about 1.0 μm (for sample No. 2) on average, the reliability of connection with the internal electrode was reduced and the target capacitance was not obtained in some samples. In contrast, it was discovered that because the second conductive layer was thick and a stress can be significantly relaxed, the mechanical strength characteristic (impact resistance) was satisfactory.

The weather resistance was not evaluated for the samples of Nos. 1 and 2 because their capacitance characteristics were not satisfactory.

For the sample of No. 3, whose T2/T1 was about 26.8, such that the ratio between the thickness of the first conductive layer and that of the second conductive layer exceeded the range of preferred embodiments of the present invention, it was discovered that although target capacitance was obtained, the weather resistance was insufficient.

It can be estimated that this is because a contraction stress occurring during hardening of the second conductive layer exceeded the adherability between the first conductive layer and the ceramic element and the first conductive layer was partially separated from the ceramic element.

Even for the sample of No. 3, it was discovered that because the second conductive layer was thick and a stress can be significantly relaxed, the mechanical strength characteristic (impact resistance) was satisfactory.

For the sample of No. 10, whose T2/T1 was about 2.7, such that the ratio between the thickness of the first conductive layer and that of the second conductive layer was below the range of preferred embodiments of the present invention, it was discovered that although target capacitance was obtained, the mechanical strength characteristic (impact resistance) insufficient because the thickness T2 of the second conductive layer was small.

In contrast, for the samples of Nos. 4 to 9, which had the requirements of preferred embodiments of the present invention, that is, the samples whose ratio between the thickness of the first conductive layer and that of the second conductive layer (T2/T1) satisfied the relationship T2/T1=about 3.4 to about 11.3, satisfactory results of the fundamental characteristic (capacitance characteristic), weather resistance, and mechanical strength characteristic (impact resistance) were obtained. For the sample of No. 8, whose T2/T1 was about 4.1, and the sample of No. 9, whose T2/T1 was about 3.4, although relatively small, a defective sample in weather resistance occurred (in one of 60 samples). However, it was discovered that the samples of Nos. 8 and 9 had satisfactory characteristics overall, in comparison with the above-described samples of Nos. 1 to 3 and 10, which do not have the requirements of preferred embodiments of the present invention.

In a present preferred embodiment, an array-type monolithic ceramic capacitor that preferably includes two capacitor sections in a ceramic element is described as an example of a ceramic electronic component. However, preferred embodiments of the present invention are also applicable to a monolithic ceramic capacitor that includes three or more capacitor sections.

Preferred embodiments of the present invention are also applicable to a monolithic ceramic capacitor other than an array type, for example, to a monolithic ceramic capacitor that includes only one capacitor section in a ceramic element.

Preferred embodiments of the present invention are also applicable to ceramic electronic components other than a monolithic ceramic capacitor, for example, to a monolithic LC composite component and monolithic coil component.

In other respects, preferred embodiments of the present invention are not limited to the above-described preferred embodiment. Variations and modifications in the type of a material used in the first conductive layer and a second conductive layer included in the external terminal electrode, the type of a ceramic material of the ceramic element, the dimensions of the ceramic element, a pattern of the internal electrode, and a method of forming the external terminal electrode can be made without departing from the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a ceramic element including opposed side surfaces;
   an inner electrode arranged in the ceramic element and including an exposed section exposed to at least one of the opposed side surfaces; and
   at least one external terminal electrode arranged on at least one of the opposed side surfaces of the ceramic element so as to be electrically coupled to the exposed section of the internal electrode; wherein
   the at least one external terminal electrode includes a first conductive layer and a second conductive layer;
   the first conductive layer is defined by a plated layer disposed directly on the at least one of the opposed side surfaces so as to be electrically coupled to the exposed section of the inner electrode;
   the second conductive layer is arranged on the at least one of the opposed side surfaces so as to cover the first conductive layer and includes conductive resin; and
   the following expression is satisfied:

$$T2/T1 = \text{about } 3.4 \text{ to about } 11.3$$

where T1 is a thickness of the first conductive layer and T2 is a thickness of the second conductive layer; and
   the thickness T1 of the first conductive layer is in a range of about 3.6 μm to about 7.8 μm.

2. The ceramic electronic component according to claim 1, wherein the thickness T2 of the second conductive layer is in a range of about 34.3 μm to about 40.8 μm.

3. The ceramic electronic component according to claim 1, wherein
   the at least one external terminal electrode includes at least two external terminal electrodes arranged on each of the opposed side surfaces;
   a longitudinal-direction dimension of the opposed side surfaces is about 1.2 mm or less; and
   a dimension between the opposed side surfaces is about 1.0 mm or less.

* * * * *